(12) United States Patent
Peacock (10) Patent No.: US 7,269,136 B2
(45) Date of Patent: Sep. 11, 2007

(54) METHODS AND APPARATUS FOR AVOIDANCE OF REMOTE DISPLAY PACKET BUFFER OVERFLOW

(75) Inventor: John Kent Peacock, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1094 days.

(21) Appl. No.: 10/232,995

(22) Filed: Aug. 30, 2002

(65) Prior Publication Data

US 2004/0042476 A1    Mar. 4, 2004

(51) Int. Cl.
*G06F 15/16* (2006.01)
(52) U.S. Cl. .................................. 370/229; 709/203
(58) Field of Classification Search ............... 370/412, 370/229; 709/201, 202, 203
See application file for complete search history.

(56) References Cited

U.S. PATENT DOCUMENTS

| | | | | |
|---|---|---|---|---|
| 5,453,980 | A * | 9/1995 | Van Engelshoven | 370/395.53 |
| 5,566,174 | A * | 10/1996 | Sato et al. | 370/468 |
| 5,913,029 | A * | 6/1999 | Shostak | 709/203 |
| 5,920,863 | A * | 7/1999 | McKeehan et al. | 707/10 |
| 5,969,764 | A * | 10/1999 | Sun et al. | 375/240.06 |
| 6,223,289 | B1 | 4/2001 | Wall et al. | |
| 6,230,296 | B1 | 5/2001 | Hanko et al. | |
| 6,952,521 | B2 * | 10/2005 | Kelly et al. | 386/52 |
| 6,996,838 | B2 * | 2/2006 | Rodriguez | 725/95 |
| 7,139,714 | B2 * | 11/2006 | Bennett et al. | 704/270.1 |
| 2002/0026495 | A1 * | 2/2002 | Arteaga | 709/217 |
| 2002/0085493 | A1 * | 7/2002 | Pekkala et al. | 370/235 |
| 2003/0110435 | A1 * | 6/2003 | Wu et al. | 714/748 |

OTHER PUBLICATIONS

Virtual Network Computing by Tristan Richardson, Quentin Stafford-Fraser, Kenneth R. Wood and Andy Hopper; 1998 IEEE Reprint from IEEE Internet Computing vol. 2, No. 1, Jan./Feb. 1998; pp. 33-38; 1089-7801/98; http://computer.org/internet; The Olivetti & Oracle Research Laboratory.

* cited by examiner

*Primary Examiner*—Min Jung
(74) *Attorney, Agent, or Firm*—Martine Penilla & Gencarella, LLP (57) ABSTRACT

The present invention manages memory buffers in a computer network system. In one embodiment, a managing system on a thin client unit modifies an amount of central processing unit (CPU) resource on the thin client unit that is granted to a server application (e.g., a X server application). The modification is based on a function of how many network information packets are in a packet queue of the thin client unit. By dropping the amount of CPU resource granted lower and lower as the queue gets more and more full, the server application reduces the rate at which it sends commands, thus giving the thin client unit the opportunity to catch up in processing the commands already in the queue. When the number of packets in the queue passes a high critical threshold, the granted CPU resource is dropped to zero, effectively shutting off the server application. Accordingly, the above embodiment makes sure that the thin client unit is kept as busy as possible because the throttling of the granted CPU resource occurs only when there is an overabundance of work waiting to be done, and the embodiment avoids packet queue overflow by slowing down and eventually stopping the flow of packets from the server application to the thin client unit.

20 Claims, 5 Drawing Sheets

METHODS AND APPARATUS FOR AVOIDANCE OF REMOTE DISPLAY PACKET BUFFER OVERFLOW

BACKGROUND OF THE INVENTION

1. Field of the Invention

The present invention relates to the field of data delivery in a computer network system and, in particular, to a method and apparatus for avoiding remote display packet buffer overflow.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

Sun, Sun Microsystems, the Sun logo, Sun Ray, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. All X trademarks are used under license and are trademarks of X Consortium in the United States and other countries. The UNIX trademark is used under license and is a trademark of American Telephone and Telegraphy Company in the United States and other countries. Products bearing SPARC trademarks are based upon an architecture developed by Sun Microsystems, Inc.

2. Description of Related Art

Figure 1:
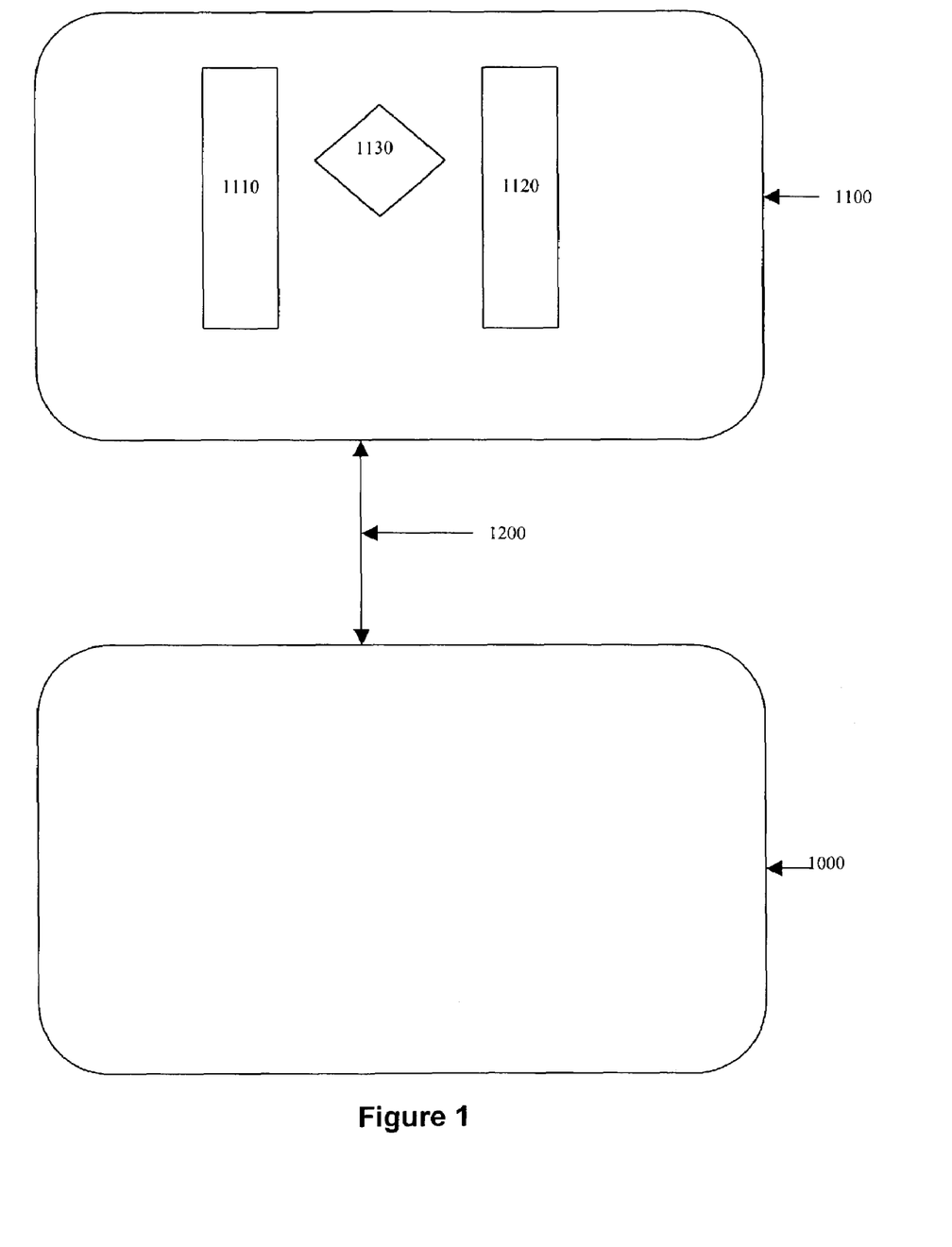
FIG. 1 is a block diagram of a computer network system wherein a server tier communicates with a client tier though a network.

The multi-tier application architecture includes at least a server tier and a client tier. Referring now to FIG. 1, the client tier 1000 communicates requests to the server tier 1100 for data, software and services, for example, and the server tier 1100 responds to the requests. The server tier's response may entail communication with a database management system for the storage and retrieval of data. The server tier 1100 typically includes a database server system 1110, an application server system 1120, and application logic 1130 (i.e., software application programs, functions, etc.). The application server system 1120 responds to application requests received from the client tier 1000. The application server system 1120 may also forward data requests from the client tier 1000 to the database server system 1110.

The client tier 1000 typically consists of a computer system that provides a graphic user interface (GUI) generated by a client application, such as a browser or other user interface application. Conventional browsers include Internet Explorer and Netscape Navigator, among others. The client application generates a display from, for example, a specification of GUI elements (e.g., a file containing input, form, and text elements defined using the Hypertext Markup Language (HTML)) and/or from an applet (i.e., a program such as a program written using the Java™ programming language, or other platform-independent programming language, that runs when it is loaded by the browser).

Further application functionality is provided by application logic 1130 managed by application server system 1120 in server tier 1100. The apportionment of application functionality between client tier 1000 and server tier 1100 is dependent upon whether a "thin client" or "thick client" topology is desired. In a thin client topology, the client tier 1000 (i.e., the end user's computer appliance or unit) is used primarily to display output and obtain input, while the computing takes place in the server tier 1100. A thick client topology, on the other hand, uses a more conventional general purpose computer having processing, memory, and data storage capabilities.

In a typical system, especially one using a thin client topology, elements of the client tier 1000 and server tier 1100 execute within separate computers interconnected over a network 1200 such as an Ethernet network, a LAN (local area network) and/or a WAN (wide area network). Because commands (e.g., graphics commands) on how and what to display on the client tier 1000 are running on the server tier 1100 and away from the client tier 1000, the server tier 1100 needs to generate the graphics commands and put them into network data packets that are sent over the network 1200 to the client tier 1000 (e.g., to the thin client appliance currently displaying the user session). This represents an extra step in getting the information (e.g., the graphics information) to the user on the client tier 1000 because the server tier 1100 is not just generating commands for a local graphics card. Thus, efficiently solving the problems associated with getting the information (e.g., the graphics information) to the user over the network 1200 to the client tier 1000 is important in providing satisfactory performance from the user's point of view. For example, as network data packets are being transmitted from the server tier 1100 to the client tier 1000, the data packets can be lost in at least two places: (1) within the network 1200 itself due to congestion, or (2) within the client tier 1000 (e.g., the client appliance and/or the remote display device) when it is unable to process the graphic commands (in the data packets) rapidly enough, and the packet storage queue for incoming packets overflows. The packet queue is referred to as a fixed number of network buffers within a client appliance that received command data packets from the server tier 1100.

Accordingly, it would be advantageous and desirable to provide methods and apparatus that effectively prevent an overflow of the data packets queue, while maintaining a steady flow of data packets to the client tier 1000 (e.g., to the client appliance and/or the remote display device).

SUMMARY OF THE INVENTION

The present invention provides methods and apparatus that effectively prevent an overflow of a data packets queue, while maintaining a steady flow of data packets to a client tier (e.g., to a thin client appliance and/or a display on the desktop appliance).

In one embodiment of the present invention, a computer network system includes a network, a first module for receiving information (e.g., graphics information) from the network, and a second module for transmitting the information to the first module over the network. A processor is coupled with the first module and has an amount of resource for processing the information. The first module is also associated with a managing system. The managing system allocates the amount of resource for processing the information. In addition, a memory device may be associated with the first module. The memory device has an amount of space for storing the information before processing by the processor. The amount of resource for processing the information may be based on the amount of space available on the memory device. The information may be in the form of a network data packet and the amount of information transmitted from the second module to the first module should be based on the amount of resource allocated by the managing system.

In another embodiment of the present invention, a method is developed for managing memory buffers in a computer network system. In this method, an amount of storage space is monitored on a first module. Based on the monitored amount of storage space, a percentage of available resource on the first module is then allocated for processing graphics information from a second module. The allocated percentage is then transmitted to the second module over a network and is used to limit the amount of graphics information sent from the second module over the network to the first module.

A more complete understanding of the present invention, as well as a realization of additional advantages and objects thereof, will be afforded to those skilled in the art by a consideration of the following detailed description of the embodiment. Reference will be made to the appended sheets of drawings which will first be described briefly.

BRIEF DESCRIPTION OF THE DRAWINGS

The drawings illustrate the design and utility of embodiments of the invention. The components in the drawings are not necessarily to scale; instead, emphasis is placed on illustrating the principles underlying the embodiment. Moreover, features, aspects and advantages of the present invention will become better understood with regard to the following description, appended claims and accompanying drawings where:

DETAILED DESCRIPTION OF THE INVENTION

The present invention provides methods and apparatus that effectively prevent an overflow of a data packets queue, while maintaining a steady flow of data packets to a client tier (e.g., to a thin client appliance and/or a display on a desktop appliance).

Figure 2:
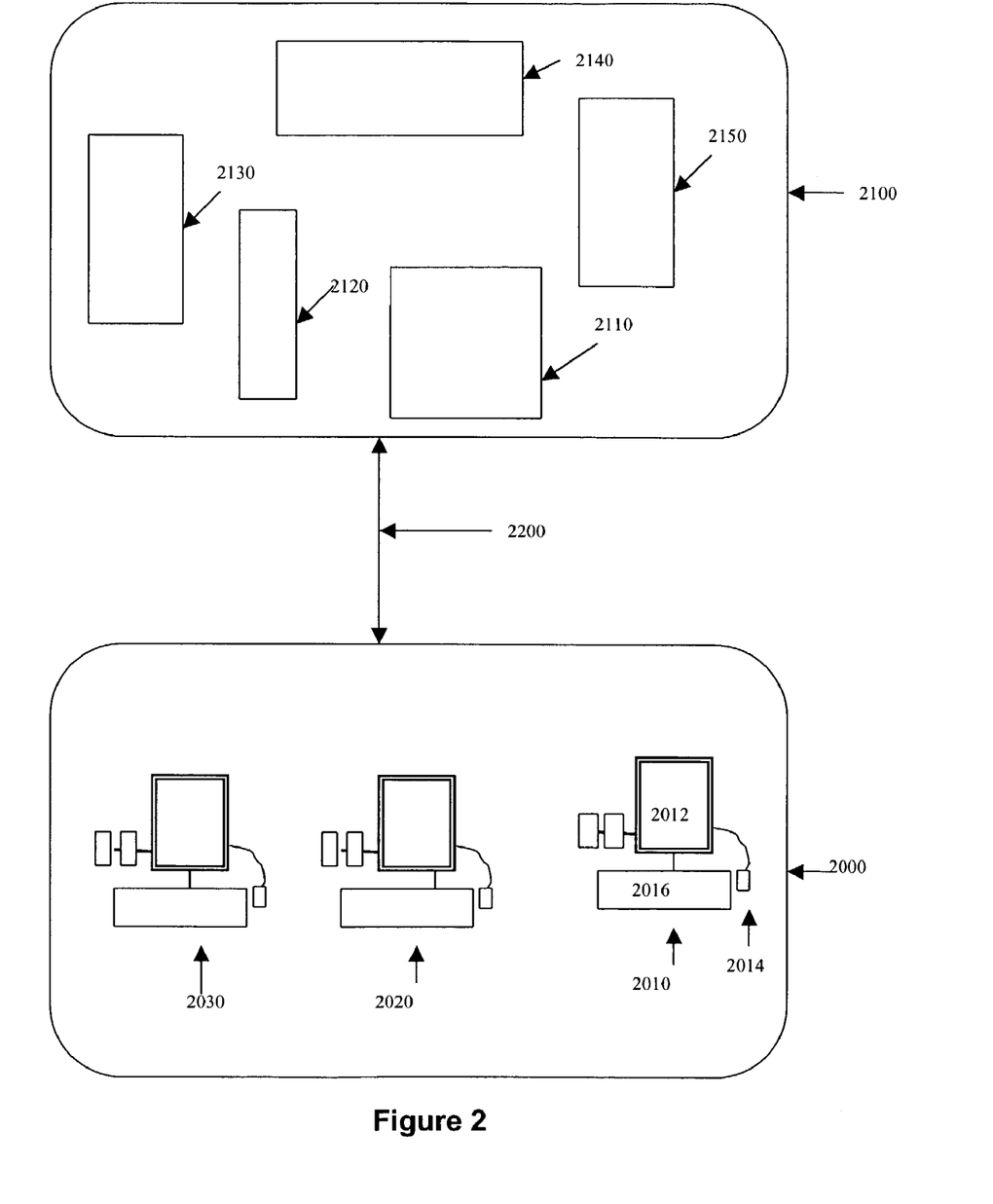
FIG. 2 is a block diagram of a computer network system wherein one or more server units communicate with one or more client units through a network, in accordance with one embodiment of the present invention.

Referring to FIG. 2, embodiments of the present invention can be implemented with at least one thin client appliance 2010, 2020, and/or 2030 in client tier 2000. A thin client appliance 2010, 2020, and/or 2030, such a Sun Ray™ thin client appliance (or unit) is a small, stateless, "plug and work" desktop appliance whose main function is to process all input and output for the user and to manage communication with at least one server appliance (or unit) 2110, 2120, 2130, 2140, and/or 2150 in server tier 2100, such as a shared Sun Ray™ server appliance (or unit). All other computational tasks (or services) for the user are, for example, performed on the Sun Ray™ server, which is shared amongst a community of Sun Ray™ users.

The computational tasks (or services) include, for example, X11/UNIX® services, archived or live audio and video services, Windows NT service, java™. program execution service, and others. As shown in FIG. 2, the computation tasks (or services) are not tied to a specific server appliance (or unit) 2110, 2120, 2130, 2140, and/or 2150 and may be distributed over one or more server appliances (or units) 2110, 2120, 2130, 2140, and/or 2150. In addition, one or more server appliances 2110, 2120, 2130, 2140, and/or 2150 may provide one or more services, or a service may be implemented by one or more server appliances 2110, 2120, 2130, 2140, and/or 2150.

A system using the thin client appliance 2010, 2020, and/or 2030, such as a Sun Ray™ enterprise system, replaces a traditional workstation system and provides the same user experience as the workstation, with no user state stored within the thin client appliance 2010, 2020, and/or 2030 (i.e., the desktop unit). This provides a unique capability called "hot desking" that allows a user to access their session from any thin client appliance 2010, 2020, and/or 2030 (or desktop unit) connected to the server tier 2100.

Referring still to FIG. 2, embodiments of the present invention can also be implemented with a server appliance 2110, 2120, 2130, 2140, and/or 2150, such as a Sun Ray™ server appliance, that provides access to the Solaris™ operating environment for a thin client unit 2010, 2020, and/or 2030, such as a Sun Ray™ thin client unit, connected to the server appliance 2110, 2120, 2130, 2140, and/or 2150. As with other UNIX® systems and/or Linux systems, for example, the display (e.g., 2012), the mouse (e.g., 2014), and the keyboard (e.g., 2016) in the thin client unit (e.g., 2010) can all be managed using a network operating extension system, such as the X Window System developed by the X Consortium.

The X Window System utilizes a protocol called X Protocol that provides a network transparent graphical user interface (GUI) primarily for the UNIX® operating system. The X Window System provides for the display and management of graphical information, much in the same manner as Microsoft's Windows and IBM's Presentation Manager. The key difference is in the structure of the X Protocol. Whereas Microsoft's Windows and Presentation Manager simply display graphical applications local to the personal computer (PC), the X Protocol distributes the processing of applications by specifying a client-server relationship at the application level. The what-to-do part of the application is called an X client application and is separated from the how-to-do part, the display, called the X server application. X client applications typically run on a server appliance (e.g., 2110, 2120, 2130, 2140, and/or 2150) and display on an X server application running on the same and/or another server appliance within the same network environment. The X client applications do not run on desktop units (e.g., 2010, 2020, and/or 2030). The application that is running on the desktop units (e.g., 2010, 2020, and/or 2030) is a software that takes the graphics commands over the network (e.g., 2200) from the X server application to create the display contents on the desktop units (e.g., 2010, 2020, and/or 2030).

The X server application translates X protocol commands from the X client application(s) into lower-level primitives that produce the desired result on the desktop unit's display (e.g., 2012), and that manage the processing of keyboard and mouse inputs. The implementations of the X server application are divided into a device-independent layer and a device-dependent layer. The device-dependent layer translates the device-independent graphics operations passed down from the device-independent layer into operations suitable for a specific graphics device, typically a graphics card incorporated into a PC, a workstation and/or the desktop units 2010, 2020, and/or 2030 shown in FIG. 2. (Note: do not confuse the notion of an X client application sending X protocol commands to the X server application with the implementation of the Sun Ray™ protocol, which involves sending graphics primitives from the X server application to a thin client unit 2010, 2020, and/or 2030, such as the Sun Ray™ desktop unit. X client applications are software applications, such as a mail program or an internet browser, that generate graphical outputs that are to be displayed on a screen and that process user inputs. That is, the outputs on the screen come as the X protocol commands from X applications to the X server application.

Referring now still to FIG. 2, in an embodiment of the present invention (such as the Sun Ray™ enterprise system), the X server application runs on a server appliance 2110, 2120, 2130, 2140, and/or 2150, and rather than generating commands for a local graphics card, the device-dependent part of the X server application generates graphics commands and puts them into network packets that are sent over the network 2200 to the desktop unit (e.g., 2010) currently displaying that user's session. This represents an extra step in getting the graphics information to the user over the network and through the desktop unit (e.g., 2010). This extra step may result in a situation where network packets are dropped (or lost) within the network 2200. The data packets may be dropped in at least two places: (1) within the network itself (e.g., 2200) due to congestion, or (2) within the desktop unit and/or thin client unit (e.g., 2010) when it is unable to process the graphics commands rapidly enough, and the packet storage queue for incoming packets overflows. The packet storage queue is a fixed number of network buffers within the desktop unit and or thin client (e.g., 2010) that receive graphic command packets from the X server application. Once these buffers are full, packets are discarded by the thin client unit (e.g., 2010). Thus, to efficiently transmit the information (e.g., the graphics information) to the user over the network (e.g., 2200), the present invention sends packets at a fast enough rate that the thin client unit (e.g., 2010) is kept busy when there is work to do, but not so fast that packets are lost.

The loss of any packets triggers an error recovery mechanism where the X server application regenerates commands to recreate areas on the screen that were affected by the lost commands. This is inefficient in that it requires data to be resent, and is undesirable because of artifacts visible to the user that appear on the display (e.g., 2012) of the thin client unit (e.g., 2010) being used by the user.

In another embodiment of the present invention, a server application (such as the X server application running on a server unit 2110, 2120, 2130, 2140, and/or 2150) attempts to avoid the overflow of the packet queue on a remote display device (e.g., 2010) by computing an estimate of how much time each graphics command generated will take to execute on the remote display device. The server application (such as the X server application) then sums the estimates for the commands to be sent, and uses this along with a central processing unit (CPU) grant (e.g., from a common authority or manager apparatus within the network environment) to attempt to ensure that the CPU of the remote display device (e.g., 2010) does not become overloaded, thus avoiding overflow of the packet queue.

In the context of the present invention, the CPU grant may be defined as a percentage of the available CPU of the remote display device (e.g., 2010) to process, for example, data from the server application (e.g., the X server application). Other services, such as an MPEG video player, can also request a portion of the CPU as well and send an independent stream of commands to the remote display device (e.g., 2010). When multiple services compete for the CPU resource, the CPU grant number reflects a fair share of the CPU available for each service, and the server application, such as the X server application, would only send enough commands to fill the allotted CPU grant. For example, if no other services requested a grant of CPU, then the grant to the server application, such as the X server application, would always be 100%. The CPU usage estimates computed by the server application are an approximation of the amount of CPU that should be used by a command, so it is possible for the estimate to be too high or too low. If the estimate is too high, not enough commands are sent to keep the remote display device busy; too low, and too many commands are sent and the remote display device (e.g., 2010) cannot keep up with the packets sent and the packet queue overflows. Accordingly, one embodiment of the present invention actually provides an estimate that is slightly low, in order to make sure that the CPU on the remote display device (e.g., 2010) is kept busy. In this case, normal gaps in the stream of command packets usually are sufficient to allow the packet queue of the remote display device (e.g., 2010) to be fully processed by the remote display device (e.g., 2010).

In yet another embodiment of the present invention, the CPU grant that is granted to the server application, such as the X server application, is modified to be a function of how many packets are in the packet queue of the remote display device (e.g., 2010). By dropping the CPU grant lower and lower as the queue gets more and more full, the server application reduces the rate at which it sends commands, thus giving the remote display device (e.g., 2010) the opportunity to catch up in processing commands in the queue. When the number of packets in the queue passes a high, critical threshold, the CPU grant is dropped to 0%, effectively shutting off the server application for the remote display device (e.g., 2010). This embodiment satisfies both requirements of making sure that the remote display device (e.g., 2010) is kept as busy as possible, since the throttling of the CPU grant occurs only when there is an overabundance of work waiting to be done, and of avoiding packet queue overflow by slowing down and eventually stopping the flow of packets from the server application.

Figure 3:
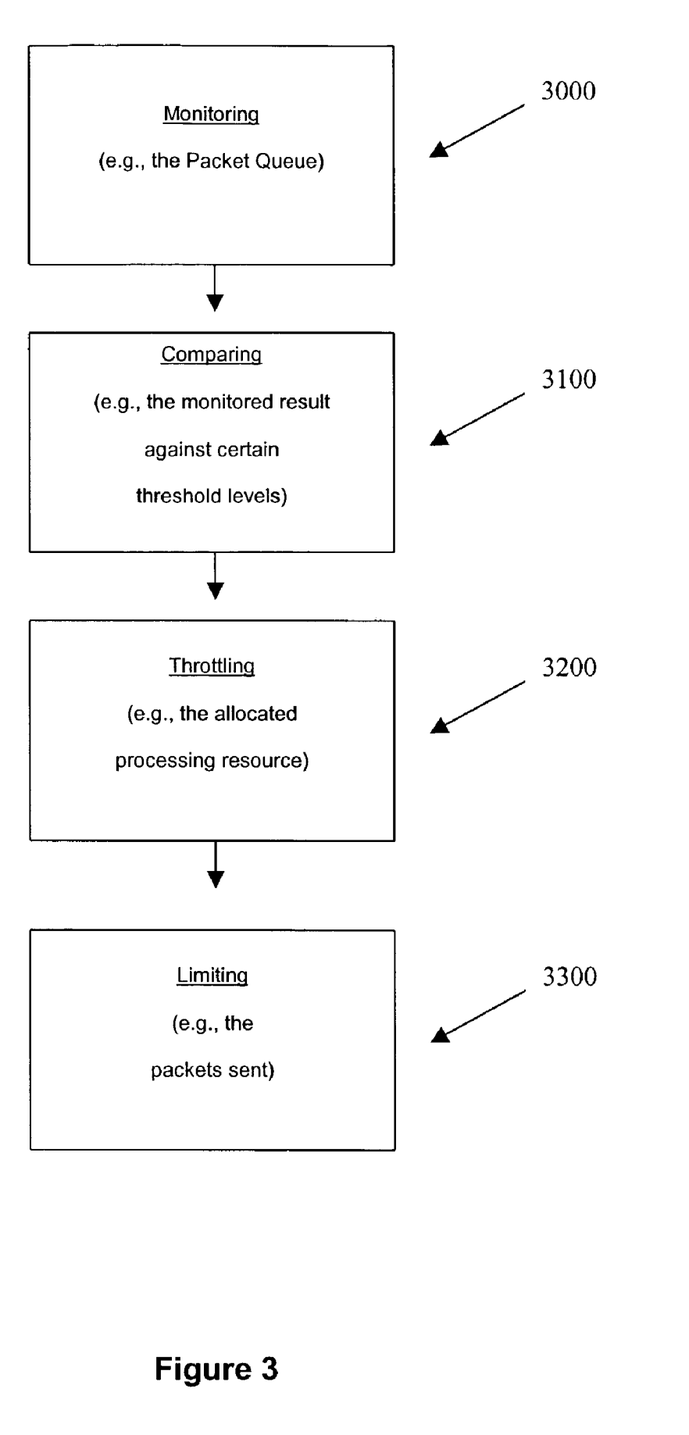
FIG. 3 is a flow diagram showing a routine on avoiding packet queue overflow in accordance with one embodiment of the present invention.

In general according to the foregoing, an embodiment of the present invention uses a remote desktop unit (e.g., 2010) having a managing routine (e.g., a managing firmware within the remote desktop unit and/or a thin client firmware) that is able to limit the CPU resource that the server application is allowed to reserve on its behalf. As diagrammed in FIG. 3, the desktop unit (using its managing routine and/or managing system) monitors its packet queue 3000, and as the queue passes certain threshold levels 3100, the desktop unit throttles back the total CPU allocation available to the server application 3200. This causes the server application to limit the packets sent progressively as the packet queue gets closer to full 3300.

The following is an exemplary thin client firmware that may be implemented with a desktop unit (e.g., 2010) in pseudo-C function code format in accordance with an embodiment of the present invention, where "cpuLimit" is the maximum grant that will be sent back to the server application:

```
int cpuLimit = 100%;
processLoop( )
{
        int i;
        int check_bw;
        packet_t packet;
        int timeSinceGrant;
        int lastMsgTime = 0;
        check_bw = 0;
        while (1) {
            i = number of packets in queue;
            if(i == 0) {
                wait for packets;
                continue;
            }
            check_bw += SetCPULimit( );      /* Get new CPU limit */
            packet = nextPacket( );          /* Get next packet from queue */
            processCommands(packet);         /* process graphics commands */
            packetFree(packet);              /* Free packet back to queue */
            timeSinceGrant = currentTime - lastMsgTime;
            if (timeSinceGrant>1_second || check_bw) {
                send new grant message to X.server;
                lastMsgTime = currentTime;
                check_bw = 0;
            }
        }
}
/* Return 1 if the CPU limit changes, 0 otherwise */
int
SetCPULimit( )
{
    i = packets in the queue;
    max = total packet storage;
    if (i > 15 * max / 16)
            newCPU = 0%;
    else if (i > 7 * max / 8)
            newCPU = 25%;
    else if (i > 3 * max / 4)
            newCPU = 50%;
    else if (i >max / 2)
            newCPU = 75%;
    else
            newCPU = 100%;
    if (newCPU == cpuLimit) /* No Change */
            return (0);
    /* If the new limit is lower, or we're back to 100% */
    if (newCPU < cpuLimit || newCPU == 100%) {
        cpuLimit = newCPU;
            return (1);
    } else {
            return (0);
        }
}
```

Note that the thin client firmware decreases the cpuLimit in steps as the queue gets more and more full, dropping the allocation to 0% as the queue gets over $15/16$th full. However, cpuLimit is not increased in steps as the queue becomes more empty. Instead, the cpuLimit is set back to 100% when the queue drops to or below half full. Accordingly, the forgoing exemplary pseudo-C code shows steps that may be taken at the client tier (e.g., 2000) for making sure that the remote display device (e.g., 2010) is kept as busy as possible, since the throttling of the CPU grant occurs only when there is an overabundance of work waiting to be done, and it avoids packet queue overflow by slowing down and eventually stopping the flow of packets from the server application.

The following is an exemplary server firmware in pseudo-C function code that shows at a high level what happens at the server tier (e.g., 2100) in accordance to an embodiment of the present invention:

```
#define TIME_SLICE 20 milliseconds /* Size of time period */
int procGrant = 100%;           /* Fraction of CPU time usable in each period */
int procControl = TIME_SLICE;   /* CPU time available in each period */
int procUsed = 0;               /* CPU time used so far in current period */
int procStart = 0;              /* Starting time of current period */
/*
 * Called to send a rendering command to the thin client.
```

-continued

```
*/
sendCommand(command_t command)
{
    if (command space required > space left in packet)
        messageFlush( );
    /*
     * Compute an estimate of the CPU used on the client for this
     * command based on the command type and its arguments.
     */
    procUsed += CPUestimate(command);
    copy command into packet;
    if (procUsed >= procControl)
        messageFlush( );
}
/*
 * Send a packet to the thin client and wait if the CPU allocation
 * for this time period is used up.
 */
messageFlush( )
{
    int goal;
    /* Send the command packet to the thin client */
    sendPacket( );
    if (procUsed >= procControl) {
        /*
         * With given CPU grant and amount of CPU used,
         * figure out when we can next start up again.
         * For example, if the procGrant is 50%, then
         * mintime = procUsed/.50 = 2 * procUsed. This
         * a wait until 2 * procUsed time has elapsed from
         * the start of the period.
         */
        int mintime = procUsed/procGrant;
        goal = procStart + mintime;
        now = current_time( );          /* Get the current time */
        if (now < goal) {
            sleep until current_time >= goal;
        }
        procStart = goal;
        procUsed = 0;
    }
}
/*
 * Called when a message is received from the thin client with
 * a new cpuLimit.
 */
receiveMessage(int cpuLimit)
{
    if (procGrant != cpuLimit) {
        /*
         * Don't let cpuLimit be 0, because then mintime
         * above becomes infinite.
         */
        if (cpuLimit != 0)
            procGrant = cpuLimit;
        else
            procGrant = 1%;
        /* Reset the usable CPU time within the slice */
        procControl = cpuLimit * TIME_SLICE;
    }
}
```

Accordingly, based on the foregoing, embodiments of the present invention effectively prevent overflows of the desktop packet queue, while maintaining a steady flow of packets to the desktop unit (e.g., 2010).

Moreover, embodiments of the invention can also be implemented as computer software in the form of computer-readable program code executed in a general purpose computing environment, in the form of bytecode class files executable within a Java™ run time environment running in such an environment; in the form of bytecodes running on a processor (or devices enabled to process bytecodes) existing in a distributed environment (e.g., one or more processors on a network); as microprogrammed bit-slice hardware; as digital signal processors; or as hard-wired control logic.

Figure 4:
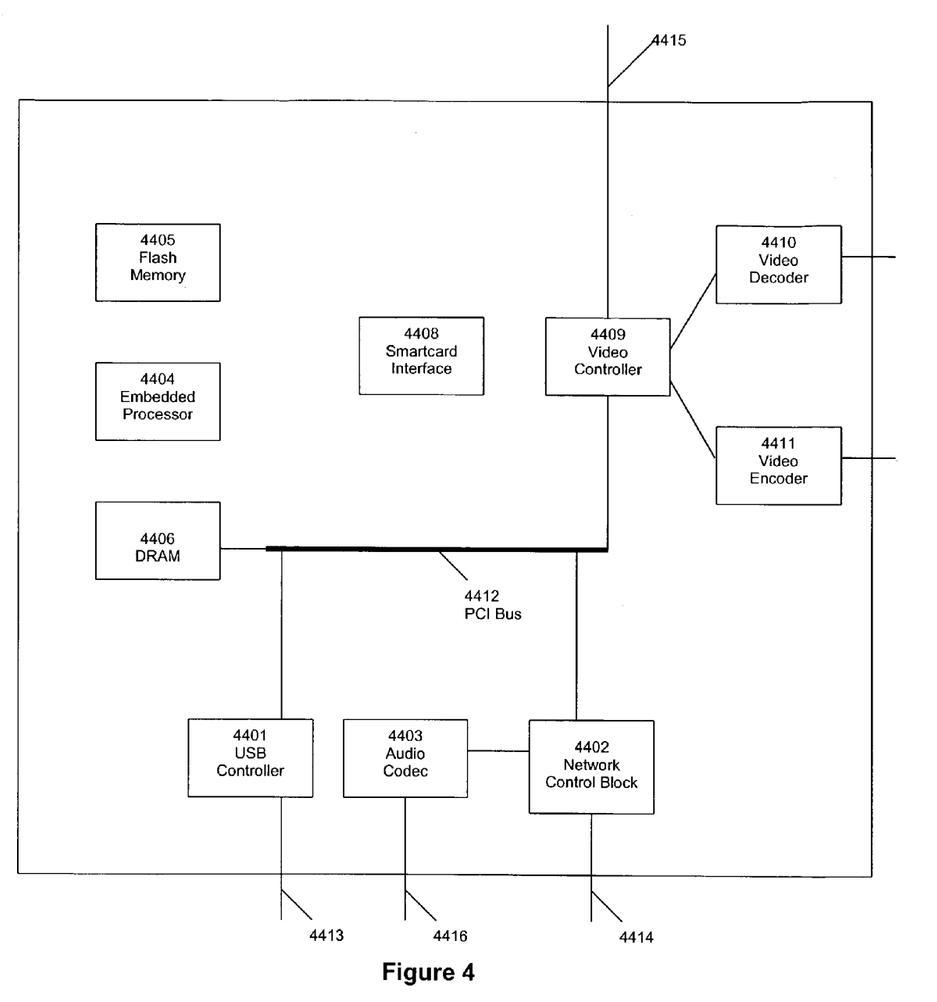
FIG. 4 is a block diagram of an example embodiment of the client unit in accordance with one embodiment of the present invention.

A block diagram of an example embodiment of a thin client unit appears as FIG. 4. The components of the thin client unit are coupled internally to a Peripheral Component Interface (PCI) bus 4412. Network control block 4402 communicates to the internal network, such as an Ethernet or intranet, through line 4414. An audio codec 4403 receives audio data on interface 4416 and is coupled to network control block 4402. Universal Serial Bus (USB) data communication is provided on lines 4413 to a USB controller 4401. The thin client unit further comprises an embedded processor 4404 such as a Sun Microsystems Sparc2ep with coupled flash memory 4405 and Dynamic Random Access Memory (DRAM) 4406. The USB controller 4401, the network control block 4402 and the embedded processor 4404 are all coupled to the PCI bus 4412. A video controller 4409, also coupled to the PCI bus 4412, can include an ATI RagePro+ frame buffer controller, which provides Super Video Graphic Array (SVGA) output on the line 4415. National Television Standard Committee (NTSC) data is provided in and out of the video controller through video decoder 4410 and encoder 4411, respectively. A smartcard interface 4408 may also be coupled to the video controller 4409.

Figure 5:
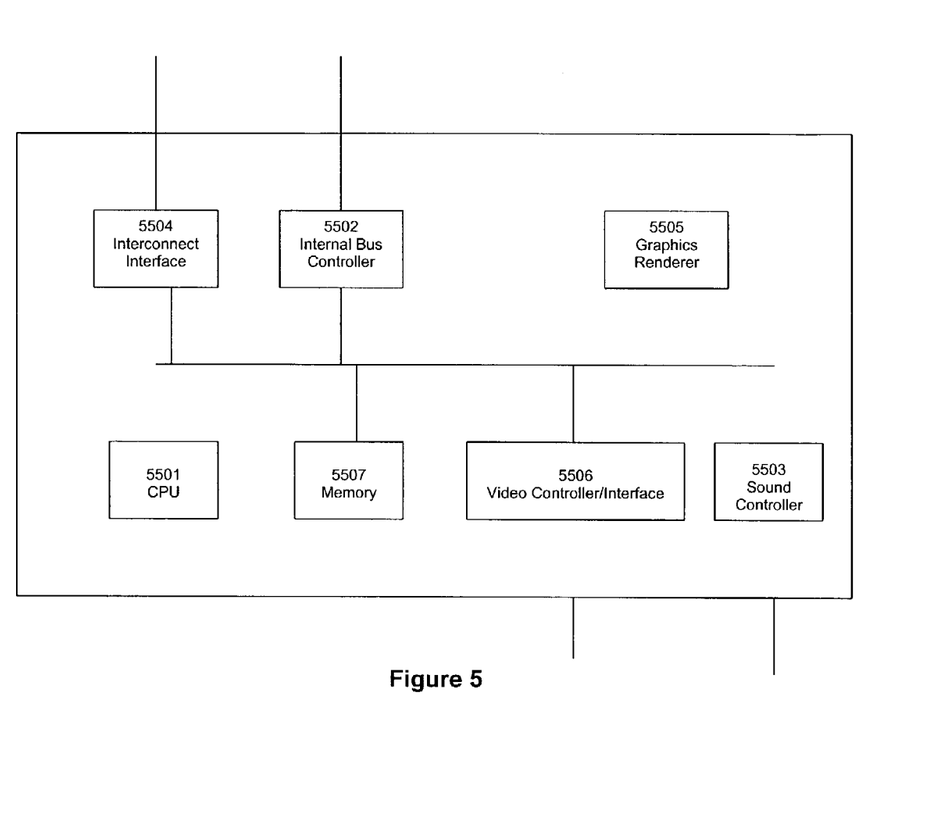
FIG. 5 is a block diagram of a single-chip implementation of a client unit in accordance with one embodiment of the present invention.

Alternatively, a thin client unit can comprise a single chip implementation, as illustrated in FIG. 5. The single chip includes the necessary processing capability implemented via CPU 5501 and graphics renderer 5505. Chip memory 5507 is provided along with video controller/interface 5506. An internal bus (e.g., USB) controller 5502 is provided to permit communication to a mouse, a keyboard and other local devices attached to the thin client unit. A sound controller 5503 and an interconnect interface 5504 are also provided. The video interface shares memory 5507 with the CPU 5501 and graphics renderer 5505. The firmware and/or software used in this embodiment may reside locally in non-volatile memory, and/or it can be loaded through the interconnection interface when the device is powered.

The computer systems described above are for purposes of example only. An embodiment of the invention may be implemented in any type of computer system or programming or processing environment.

Having thus described embodiments of the present invention, it should be apparent to those skilled in the art that certain advantages of this computer network system have been achieved. It should also be appreciated that various modifications, adaptations, and alternative embodiments thereof may be made within the scope and spirit of the present invention. For example, the transmission of information with a Sun Ray™ network computing system has been illustrated, but it should be apparent that the inventive concepts described above would be equally applicable to other types of system where display contents are generated on one computer and then transferred over a network to another computer and/or display device. The invention is further defined by the following claims.

The invention claimed is:

1. A computer network system for managing memory buffers comprising:
 a network;
 a first module for receiving a data packet from the network;
 a second module for transmitting the data packet to the first module over the network;
 a processor connected with the first module and having an amount of resource for processing the data packet;
 a memory device associated with the first module and having an amount of space available for storing data packets before processing by the processor; and
 a managing system associated with the memory device, wherein the managing system allocates the amount of resource for processing the data packet, and wherein the managing system is capable of determining the amount of resource for processing the data packet by monitoring the amount of space available for storing data packets.

2. The computer network system of claim 1, where the managing system allocates the amount of resource for processing the data packet in proportion to the amount of space available for storing data packets.

3. The computer network of claim 1, wherein the managing system uses a plurality of predetermined threshold levels on the amount of space available for storing data packets to determine the amount of resource for processing the data packet.

4. The computer network of claim 1, wherein the amount of resource for processing the data packet is measured in percentage and wherein the amount of resource for processing the data packet is approximately zero percent when the amount of space available for storing data packets is greater than approximately $15/16^{th}$ full.

5. The computer network system of claim 1, wherein the amount of resource for processing the data packet is measured in percentage and wherein the amount of resource for processing the data packet is approximately 100 percent when the amount of space available for storing data packets is not greater than approximately $1/2^{th}$ full.

6. The computer network system of claim 1, wherein the amount of resource for processing the data packet allocated by the managing system is below a fair share of resource available on the processor for processing the data packet.

7. The computer network system of claim 1, wherein the management system includes a computer firmware located with the first module.

8. The computer network system of claim 1, wherein the first module includes a thin client and wherein the second module includes a server computer.

9. The computer network system of claim 1, wherein the second module includes a server application that is capable of generating the data packet.

10. The computer network system of claim 9, wherein the data packet includes a graphics primitive.

11. The computer network system of claim 10, wherein the second module further includes a client application, where the client application sends a protocol command to the server application, and wherein the graphics primitive is generated from the protocol command.

12. The computer network system of claim 11, wherein the protocol command includes an X protocol command.

13. The computer network system of claim 11, wherein the second module further includes a first server computer and a second server computer, wherein the client application is running on the first server computer, and wherein the server application is running on the second server computer.

14. The computer network system of claim 10, wherein the first module includes a graphics device and wherein the graphics primitive is in a format suitable for the graphics device.

15. A method for managing memory buffers in a computer network system comprising:
 monitoring an amount of storage space available on a first module;
 allocating a percentage of available resource on the first module for processing graphics information from a second module based on the monitored amount of storage space;
 transmitting the allocated percentage to the second module over a network; and
 limiting an amount of graphics information sent from the second module over the network to the first module based on the allocated percentage.

16. The method of claim 15, wherein allocating a percentage of available resource on the first module includes:
 allocating a first percent of available resource on the first module for processing graphics information from the second module, if the amount of storage space available is greater than a first predetermined value full; and allocating a second percent of available resource on the first module for processing graphics information from the second module, if the amount of storage available is not greater than a second predetermined value full, wherein the first predetermined value is greater than the second predetermined value, and wherein the first percent is less than the second percent.

17. The method of claim 16, wherein the first predetermined value is approximately $15/16^{th}$ and the second predetermined value is approximately $1/2^{th}$.

18. The method of claim 17, wherein the first percent is approximately zero and wherein the second percent is approximately 100.

19. The method of claim 18, wherein allocating a percentage of available resource on the first module further includes:

allocating approximately 25 percent of available resource on the first module for processing graphics information from the second module, if the amount of storage space available is not greater than approximately $15/16^{th}$ full and is greater than approximately $7/8^{th}$ full;

allocating approximately 50 percent of available resource on the first module for processing graphics information from the second module, if the amount of storage available is not greater than approximately $7/8^{th}$ full and is greater than $3/4^{th}$ full; and allocating approximately 75 percent of available resource on the first module for processing graphics information from the second module, if the amount of storage available is not greater than approximately $3/4^{th}$ full and is greater than $1/2^{th}$ full.

20. A computer network system for managing memory buffers comprising:

a network;

a first module for receiving graphics information from the network, the first module including an amount of space for storing the graphics information before processing by the processor, wherein the amount of resource for processing the graphics information is based on the amount of space for storing the graphics information;

a second module for transmitting the graphics information to the first module over the network;

a processor connected with the first module and having an amount of resource for processing the graphics information; and a managing system associated with the first module:

wherein the managing system allocates the amount of resource for processing the graphics information, and wherein the second module determines an amount of graphics information to be transmitted to the first module based on the amount of resource for processing the graphics information.

* * * * *